July 25, 1967     D. S. DENCE     3,332,522
VEHICLE OPERATOR SEAT BRAKE CONTROL SYSTEM
Filed May 9, 1966
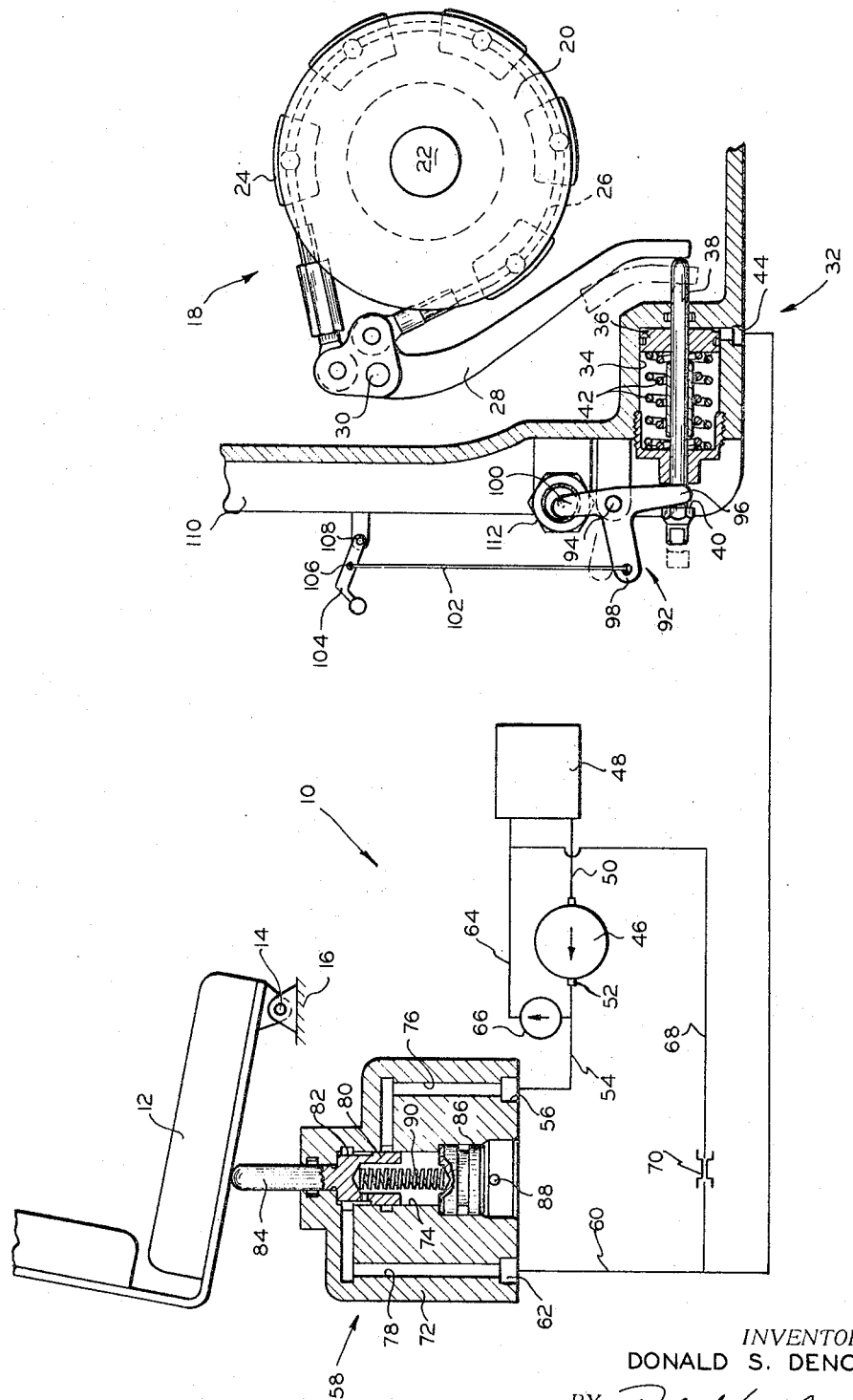
INVENTOR
DONALD S. DENCE
BY Robert H. Johnson
ATTORNEY

United States Patent Office 3,332,522
Patented July 25, 1967

3,332,522
VEHICLE OPERATOR SEAT BRAKE CONTROL
SYSTEM
Donald S. Dence, Jackson, Mich., assignor to Clark
Equipment Company, a corporation of Michigan
Filed May 9, 1966, Ser. No. 548,639
6 Claims. (Cl. 188—109)

This invention relates to brake control systems, and more specifically to such systems that are used in conjunction with the parking brake of fork lift trucks and other similar vehicles.

Brake control systems for releasing the parking brake of fork lift trucks and similar vehicles are known. Generally, such systems are made up of mechanical linkages that are actuated when the operator's seat is occupied to release the parking brake. Such linkages are generally complex and often require substantial movement of the operator's seat to actuate the linkage to release the parking brake. It is a principal object of my invention to provide a brake control system that is simple and inexpensive.

Another object of my invention is to provide a brake control system that requires only a slight movement of the operator's seat to release the parking brake of the associated vehicle.

A further object of my invention is to provide a brake control system that applies the parking brake whenever the operator's seat is unoccupied or the vehicle prime mover is not operating.

In carrying out my invention in the preferred embodiment thereof I provide a hydraulic motor which is spring biased to apply the vehicle parking brake and when supplied with pressurized fluid releases the vehicle parking brake. The hydraulic motor is connected to a source of pressurized fluid by means of a conduit. Disposed in the conduit is a valve which has an open position to place the hydraulic motor in fluid communication with the source of pressurized fluid via the conduit and a closed position in which fluid communication between the source of pressurized fluid and the hydraulic motor is blocked. The valve is normally closed and is operatively connected to the operator's seat of the vehicle so that when the seat is occupied the valve is actuated to the open position thereof. A fluid conduit connects the fluid reservoir with the other conduit between the valve and the hydraulic motor so that the pressure of fluid supplied to the hydraulic motor is reduced when the valve is closed.

The above and other objects, features and advantages of my invention will be more readily understood by a person skilled in the art when the following detailed description is taken in conjunction with the accompanying drawing which shows schematically a preferred embodiment of my invention.

Referring now to the drawing, the reference numeral 10 refers to a brake control system which is particularly suitable for use with a fork lift truck or similar vehicle. Brake control system 10 is responsive to the occupancy of an operator's seat 12 which is pivotally mounted at 14 to a portion of a vehicle body 16. Further, brake control system 10 actuates a parking brake 18.

Parking brake 18 includes a drum 20 fixed to a vehicle drive shaft 22 for rotation therewith, the drum including a tapered groove in the periphery thereof. Disposed in the groove is a plurality of tapered friction shoe members 24 which are connected to a cable 26 that substantially encircles drum 20. The ends of cable 26 are connected, as shown, to an actuating lever 28 that is mounted for pivotal movement on a pin 30. When actuating lever 28 is pivoted in a counterclockwise direction, as shown, cable 26 is tightened around drum 20 so that shoes 24 forceably engage the groove in the outer periphery of drum 20 with the result that drum 20 is held from rotation.

By permitting lever 28 to pivot in a clockwise direction the tension on cable 26 is released. This is because cable 26 tends to straighten itself. As a result shoes 24 are no longer held in frictional engagement with the groove in drum 20 and parking brake 18 is released. For a more detailed description of a brake of this type see my copending application, Ser. No. 540,016, filed April 4, 1966.

Disposed adjacent to lower end of lever 28 is a piston and cylinder type hydraulic or fluid actuator 32 which includes a cylinder 34 within which a piston 36 is slidably disposed. Fixed to piston 36 is a piston rod 38 that extends through both ends of cylinder 34. One end of rod 38 is disposed to engage lever 28, as shown, and the other end of rod 38 has a shoulder 40. Disposed in cylinder 34 between piston 36 and the end of cylinder 34 opposite lever 28 is a pair of compression springs 42. These springs 42 serve to bias rod 38 toward the right and pivot lever 28 counterclockwise about pin 30. A fluid port 44 communicates with cylinder 34 at the end adjacent lever 28 so that when pressurized fluid is supplied to port 44, and hence cylinder 34, rod 38 is actuated toward the left so that lever 28 may move from the solid line position to the dotted line position, releasing brake 18.

A fluid pump 46 which is driven by the vehicle prime mover serves as a source of pressurized fluid and draws fluid from a reservoir 48 via a fluid conduit 50. Connected to the outlet 52 of pump 46 is another fluid conduit 54 which communicates with the port 56 of a valve 58. Another fluid conduit 60 connects the port 62 of valve 58 with port 44 of fluid motor 32.

Other fluid circuitry includes a fluid conduit 64 which connects conduit 54 with reservoir 48 and has a pressure relief valve 66 disposed therein. When a predetermined pressure is generated by pump 46 valve 66 opens and bypasses pressurized fluid back to reservoir 48 via conduit 64 so that damage to the control system through excessive pressure is prevented. Further, a conduit 68 is connected between conduits 60 and 64 and includes a restriction 70 therein to limit the rate of fluid flow through conduit 68. Although conduit 68 is shown as including a restriction therein it should be understood that the capacity for fluid flow of conduit 68 itself may provide sufficient restriction so that a separate restriction would not be necessary.

Valve 58 includes a body 72 with a bore 74 therein. A fluid passage 76 in body 72 communicates port 56 with bore 74 and a fluid passage 78 communicates port 62 with bore 74 also.

Slidably disposed in bore 74 is a spool 80 which has an annular groove 82 in the periphery thereof. Spool 80 also includes a projection 84 which extends outwardly through body 72. Valve 58 is connected to the vehicle body and disposed so that projection 84 engages the underside of seat 12 for reasons that will become clear shortly.

Disposed in bore 74 between spool 80 and a plug 86 which is held in place by a cross pin 88 is a compression spring 90 which serves to bias spool 80 to the position shown. In this position fluid communication between passages 76 and 78 is blocked. When spool 80 is actuated downwardly to the point where groove 82 communicates with passage 76 fluid communication between passages 76 and 78 is established.

In certain circumstances it is necessary to be able to release parking brake 18 other than by supplying pressurized fluid to fluid motor 32. This is accomplished through actuation of a bell crank 92. Bell crank 92 is pivotally connected to a pin 94 adjacent fluid actuator 32 and includes three legs 96, 98 and 100. Leg 96 engages shoulder 40 on rod 38 so that clockwise rotation of bell crank 92 causes rod 38 to move toward the left. A rod 102 is pivotally connected at one end thereof to leg 98, the other end thereof being pivotally connected to a lever arm 104 at 106. Lever arm 104 is pivotally connected at 108 to member 110. When lever arm 104 is moved clockwise into abutment with member 110 it is moved past an overcenter position so that it is locked in abutment with member 110. When lever arm 104 is pivoted in a clockwise direction bell crank 92 also is pivoted in a clockwise direction, whereby rod 38 is shifted toward the left sufficiently so that brake 18 is released.

Adjacent bell crank 92 is a neutral starting switch 112 which is a normally open switch and when open prevents starting of the vehicle prime mover. Leg 100 of bell crank 92 engages switch 112 when bell crank 92 is in the position shown and actuates switch 112 to close so that the vehicle prime mover may be started. When bell crank 92 is actuated in a clockwise direction either through actuation of lever arm 104 or actuation of fluid motor 32 leg 100 is moved away from switch 112 so that it opens. Consequently, it is not possible to start the vehicle prime mover unless parking brake 18 is applied.

I will now explain the operation of my invention in order to enable persons skilled in the art to better understand it. It will be assumed that brake control system 10 is embodied in a fork lift truck, although it is suitable for use with other vehicles, and that the vehicle is not presently occupied. Under these conditions brake control system 10 will be as shown in the drawing, parking brake 18 being applied. Now, it will be assumed that an operator occupies seat 12, causing seat 12 to pivot downwardly about point 14. This causes spool 80 to move downwardly sufficiently so that groove 82 places passages 76 and 78 in fluid communication with each other. At this point parking brake 18 would still be applied since the vehicle prime mover has not yet been started, and so pressurized fluid is not being generated by pump 46. Now, the operator starts the vehicle prime mover which he is able to do since neutral starting switch 112 is actuated to its closed position with leg 100 of bell crank 92 positioned as shown. Once the vehicle prime mover is operating pump 46 will begin to generate pressurized fluid and, since passages 76 and 78 are in fluid communication due to spool 80 being depressed, supply pressurized fluid to fluid motor 32. As a result piston 36 and rod 38 shift to the left against the bias of springs 40, thus permitting brake 18 to release.

Whenever the operator leaves seat 12, spring 90 moves spool 80 upwardly so that fluid communication between passages 76 and 78 is blocked. When this occurs the pressure of fluid in fluid actuator 32 drops because conduit 60 is in communication with reservoir 48 via conduits 68 and 64. Further, should the vehicle prime mover cease to operate the pump 46 will no longer supply pressurized fluid. In this case also parking brake 18 will be applied because the pressure of fluid in fluid motor 32 will drop since conduit 60 is connected to reservoir 48 via conduits 68 and 64, thus permitting springs 40 to apply brake 18 through actuation of lever arm 28.

In the event that it is desired to tow the fork lift truck without operating the prime mover, the operator merely needs to move lever arm 104 from the position shown to the position in which it abuts member 110. This moves rod 38 to the left sufficiently for brake 18 to release and locks rod 38 in this position.

The above detailed description is intended to be illustrative only, and it will be understood that the brake control system disclosed may be used with vehicles other than fork lift trucks and that it may be used with vehicles having prime movers that are either internal combustion engines or electric motors. These and other modifications and changes which fall within the scope and spirit of my invention may occur to others skilled in the art. Consequently, the limits of my invention should be determined from the following claims.

I claim:

1. For use in a vehicle having a prime mover, a brake, a seat and a fluid reservoir, the combination comprising means for releasing and applying the brake including spring means for normally applying the brake and a fluid motor operable when pressurized fluid is supplied thereto to release the brake, a source of pressurized fluid connected to the reservoir, the said source including a pressurized fluid outlet, first fluid conduit means connecting the said outlet with the said fluid motor, valve means in the said conduit means, the said valve means being actuatable between an open position providing fluid communication between the said outlet and fluid motor via the said conduit means and a closed position blocking fluid communication between the said outlet and fluid motor via the said conduit means, means biasing the said valve means to the closed position thereof, the said valve means being operatively connected to the seat so that when the seat is occupied the said valve means is actuated to the open position thereof and when the seat is unoccupied the said biasing means actuates the said valve means to the closed position thereof, and means for reducing the pressure of fluid supplied to the said fluid motor when the said valve means is actuated to the closed position thereof.

2. The combination as set forth in claim 1 wherein the said pressure reducing means includes a second fluid conduit means connecting the reservoir with the said first fluid conduit means between the said valve means and fluid motor and means for restricting fluid flow through the said second fluid conduit means.

3. The combination as set forth in claim 1 and including manually operated means connected to the said fluid motor for locking the said fluid motor in the brake releasing position thereof.

4. The combination as set forth in claim 1 and including means for preventing starting of the prime mover unless the brake is applied.

5. The combination as set forth in claim 2 and including manually operated means connected to the said fluid motor for locking the said fluid motor in the brake-releasing position thereof.

6. The combination as set forth in claim 2 and including manually operated means connected to the said fluid motor for locking the said fluid motor in the brake-releasing position thereof and means for preventing starting of the prime mover unless the brake is applied.

References Cited

UNITED STATES PATENTS

| 772,654 | 10/1904 | Fraser. | |
|---|---|---|---|
| 2,044,944 | 6/1936 | House | 188—109 |
| 2,918,145 | 12/1959 | White | 188—109 X |

DUANE A. REGER, *Primary Examiner.*